United States Patent Office 2,941,970
Patented June 21, 1960

2,941,970

METHOD FOR DISPERSION OF PIGMENTS IN ACRYLONITRILE POLYMER SOLUTIONS

Alfred B. Craig, Decatur, Ala., assignor to The Chemstrand Corporation, Decatur, Ala., a corporation of Delaware No Drawing. Filed June 8, 1955, Ser. No. 514,109

14 Claims. (Cl. 260—29.6)

The present invention relates to an improved process for producing uniformly colored fibers from acrylonitrile polymers. More particularly, it relates to a method whereby pigments are uniformly dispersed throughout solutions used in spinning fibers from acrylonitrile polymers and to the preparation of colored fibers therefrom.

It is well-known that polyacrylonitrile and copolymers of acrylonitrile and other mono-olefinic polymerizable monomers are excellent fiber-forming polymers. The polyacrylonitrile and copolymers of more than 85 percent acrylonitrile and up to 15 percent of other polymerizable monomers produce fibers with superior tensile properties, desirable elongation, and excellent stability under a wide range of physical and chemical conditions. These polymers are, however, subject to an inherent disability which greatly restricts their utility in the fabrication of general purpose fibers. That is, the fibers do not have sufficient dye affinity to enable the development of satisfactory colored fibers, and the limited range of colors produced by conventional dyeing techniques are not stable to laundering and dry-cleaning procedures.

The prior art acrylonitrile polymers which are particularly subject to this disadvantage, but which can be made into fibers having excellent physical properties and are consequently useful in the practice of this invention, are polyacrylonitrile and copolymers of 85 percent or more of acrylonitrile and up to 15 percent of mono-olefinic polymerizable monomers, such as vinyl acetate and other vinyl esters of monocarboxylic acids having up to four carbon atoms, methyl methacrylate, and other alkyl methacrylates having up to four carbon atoms in the alkyl radical, methyl acrylate and other alkyl acrylates having up to four carbon atoms in the alkyl group, dimethyl fumarate and other dialkyl fumarates having up to four carbon atoms in the alkyl groups, dimethyl maleate and other dialkyl maleates having up to four carbon atoms in the alkyl groups, styrene, $\alpha$-methylstyrene, and other vinyl or isopropenyl substituted aromatic hydrocarbons, vinyl chloroacetate and other vinyl esters of halo-substituted acetic acids, vinylidene chloride, vinyl chloride, and methacrylonitrile.

These polymers are, in general, of negligible dye receptivity and, therefore, fibers prepared therefrom are limited in their usefulness. Many proposals have been made to overcome this disadvantage of the otherwise excellent fibers. Perhaps the most successful step in this direction has been the incorporation of certain monomers having tertiary amine groups in the polymer structure, either by copolymerization of the dye receptive monomer with acrylonitrile, or by blending techniques whereby a fiber-forming polymer having a high acrylonitrile content is blended with a second polymer having a high content of a dye receptive monomer.

While the latter methods have gone far to overcome the inherent disadvantages of acrylic fibers, there have nevertheless remained problems in connection with fibers containing the tertiary amino groups. The most serious of these problems is the undesirable color which usually results from heating such polymer compositions, such as during drying operations.

More recently, attempts have been made to color these acrylic fibers by incorporation of pigments in the spinning solutions before actual formation of the fibers. Such a method of coloring fibers would offer several advantages over dyeing, among which may be mentioned the exceptional wash and light fastness obtainable by having the color dispersed throughout the fiber. Of equal importance is the fact that colored fibers could be produced somewhat cheaper by elimination of the expensive dyeing operations now necessary with acrylic fibers of the above-mentioned compositions.

Several methods for incorporation of color prior to spinning have been proposed. A method which has met with considerable success in coloring other polymeric materials involves addition of the coloring matter to the monomers prior to polymerization. Most of the available pigments and dyes inhibit polymerization of acrylonitrile, so that the method is not feasible for coloring acrylic fibers. Another prior art method involves the mastication of polymer and coloring matter to form a concentrate which is then mixed with the main batch of polymers to be colored. In this method, the polymer batch must be maintained at a sufficiently high temperature to insure plasticity of the polymer. Because of their very high softening points, acrylonitrile polymers cannot be successfully masticated due to degradation of the polymers.

Many excellent pigments are produced and/or supplied as water dispersions or pastes and in this form are quite finely divided. In fact, the particle sizes of pigments in these dispersions or pastes are such that they could be used directly as additions to acrylonitrile polymer spinning solutions, with only a simple mixing step required for distribution of the particles throughout the spinning solution. This is not always possible, however, since more than three percent water on the weight of the solvent in the spinning solutions is sufficient to cause gelation or coagulation of a portion of the polymer, which in turn clogs the spinning jets and causes considerable difficulty. The obvious expedient of removing all the water from the dispersions or pastes is not the solution to this problem, because removal of water causes the pigment particles to coalesce so that the critical small sizes can only be obtained again by mastication for a considerable time.

An object of the present invention is to provide an economical and practical process for effecting the uniform distribution of water-dispersible materials throughout polymers containing at least 85 percent acrylonitrile. A more particular object is to provide such a process for the uniform coloration of such acrylonitrile polymers, particularly fibers thereof. A still further object is to provide such a process which will be more economical and avoid the undesirable features of the prior art processes. Still another object is to provide a method for the dispersion of water-dispersible materials in organic solvents. Other objects will be apparent from the description of the invention given hereinafter.

These objects are accomplished according to the present invention by mixing a water-dispersion of a water-dispersible material with a selected organic solvent of a type defined hereinafter, and limiting the water to below three percent in the resulting mixture. The resulting color concentrate of dispersible material in solvent containing less than three percent water is incorporated in solutions of acrylonitrile polymers, and fibers are prepared therefrom.

In a more specific form of this invention, a dispersion of a pigment in water is utilized wherein the diameter of the pigment particles is not greater than about 1 micron. Ordinarily, spinning jets will not be clogged by particles as large as about 15 microns in diameter, but uniform distribution of color is obtainable only when practically all particles are not greater than about 1 micron in diameter.

The dispersion is then mixed with an organic solvent, and the water removed until there remains not more than three percent based on the total weight of solvent. The water can be removed from the dispersion of pigment in solvent by distillation to form a color concentrate containing not more than three percent water. Any organic solvent inert with respect to the pigment and from which water can be easily removed by distillation can be used in the process of this invention. In order that the resulting dispersion of pigment in solvent can be utilized to color acrylonitrile polymers it is essential that the solvent be chemically inert with respect to the polymer, and that it not interfere with solution of the polymer in the organic solvent used for the spinning solution. Preferred solvents are water-miscible solvents for acrylonitrile polymers, having boiling points higher than about 120° C. As examples of suitable solvents, there may be mentioned N,N-dimethylacetamide, N,N - dimethylformamide, tris(dimethylamido) phosphate, ethylene carbonate, bis(dimethylamido) methanephosphonate, dimethyl methanephosphate, N-methylpyrrolidone, 1,5-dimethylpyrrolidone, butyrolactone, diethyl phosphite, and N,N-dimethylmethoxyacetamide. Other suitable solvents are well-known to the art.

Most of the solvents having the characteristics essential for use in this process are mutually compatible so that one solvent can be used for preparing the dispersion of pigment, while another solvent can be used in preparing the spinning solution. It may be necessary to run a preliminary experiment, however, to determine whether the dispersing solvent will interfere with the stability of the spinning solution or with the actual spinning operation. The preferred procedure, therefore, is to utilize the same solvent for the dispersion as is used for the spinning solution. In this manner, optimum results are assured regardless of the solvent used.

During the distillation process to accomplish removal of water the temperature employed will depend upon whether the operation is conducted at atmospheric or subatmospheric pressures. Ordinarily atmospheric pressure is all that is required and the distillation temperature can be maintained at the boiling point of water. In some instances the water will be removed as an azeotrope with the organic solvent, thus permitting lower temperatures. For an extremely sensitive pigment structure, lower temperatures may be required and in such cases distillation can be effected under a partial vacuum. The distillation apparatus employed may be of any suitable construction as long as it provides a means for the application of heat, maintenance of the desired pressure and means for the removal and condensation of water.

The color concentrate, which comprises the colored pigment dispersed in the organic solvent, can be homogeneously incorporated in the acrylonitrile polymer spinning solution in any convenient manner. Thus, in a batch operation the color concentrate, containing less than three percent water, can be thoroughly mixed with a solution of the acrylonitrile polymer in the same or a compatible organic solvent. Alternatively, the color concentrate as prepared may contain all the organic solvent desired in the final spinning solution, and the dry ground polymer may be dissolved in the color concentrate by thorough agitation at a temperature and for a time sufficient to effect solution. In this manner a spinning solution can be prepared containing not more than three percent water at any time and a spinnable polymer concentration without any danger of coagulation upon mixing two solutions.

The most preferable means for incorporating the color concentrate in a spinning solution is by injecting the concentrate into a moving stream of polymer solution. Such injection is preferably made at a point immediately before the spinning solution is extruded from the spinnerets. In this manner a continuous method of producing pigmented fibers is afforded. It is essential that thorough mixing be effected to insure uniform dispersion of the pigment throughout the spinning solution so that the fibers produced therefrom will be uniformly colored. In order to prevent local coagulation which would clog the jets it is imperative that the color concentrate injected contain not more than three percent water.

When only small amounts of pigment are required for the fiber color desired a color concentrate can frequently be prepared which contains not more than three percent water. It is apparent that, in such cases, the color concentrate is limited to not more than three percent water and can be employed directly without further reducing the water content, since it is already below the critical value causing coagulation and clogging.

The relative proportions of pigment and solvent in the color concentrate are not critical, the concentration being chosen to secure the desired color intensity in the final product. Even the final color desired in the finished fibers is not controlling in this regard, since greater or lesser amounts of the color concentrate can be added to the spinning solution, depending on the concentration of pigment in the concentrate.

The aqueous dispersion of pigment which is used in this invention may be in the form of a slurry or colloidal suspension such as might be obtained form the various processes which are employed to prepare the said pigments or it may be in the form of a partially dehydrated paste. This latter form, i.e., the partially dehydrated paste, is the more preferred form to be employed in the process as it eliminates the necessity of handling large and cumbersome amounts of slurry and enables the said process to be conducted in a more efficient and economical manner.

The partially dehydrated pigment paste may be readily prepared by subjecting an aqueous solution or slurry of the pigment to a filtration process and then partially dehydrating the resulting pigment pulp by evaporation at a relatively low temperature in order to remove excess water. The evaporation should not be continued too far, however, as the pigment pulp should remain quite wet in order to maintain the fine colloidal structure of the pigment particles. In some cases the dehydrating may be continued until the pigment pulp contains only about 50 percent by weight of water, while in other cases it may be necessary to stop the dehydration when the pigment pulp still contains about 90 percent by weight of water. Generally, however, it is possible to continue the dehydration until the water content of the pulp has been reduced to from about 75 percent to about 85 percent by weight of water. Pigment pastes containing this range of water content, i.e., from about 75 percent to about 85 percent, are the most preferred to be employed in the process.

The preparation of the aqueous dispersion for use in this invention is simply a matter of following the practice well-known in the art. If the pigment was not produced as an aqueous dispersion, a dispersing agent will be required. The selection of a specific dispersing agent and the proportion in which it will be used, will present no problem to those skilled in the art. Generally, the dispersing agent will be used within the range of 0.1 percent to three percent by combined weight of the water and pigment. Water-soluble, non-foaming dispersing agents are preferred but others may be used. The dispersing agent may be anionic, cationic, non-ionic, or a protective colloid. A suitable dispersing agent may be chosen from the many disclosed in "Surface Active Agents" by Young and Coons, Chemical Publishing Company, Brooklyn, New York, 1945. A few preferred dispersing agents are polymerized organic salts of alkyl aryl sulfonic acids, partially hydrolyzed polyvinyl esters, sulfated aryl alcohols, quaternary ammonium salts, sodium alkyl napthalene sulfonate, sulfosuccinic acid esters, sulfonated amides, partial esters of polyhydric alcohols with long chain carboxylic acids, sorbitol, esters of long chain polyethylene glycols, and others.

As previously indicated, the proportion of water-dispersible pigment to water has substantially no effect on the operability of this invention. That is, any proportion at all may be used between the perfectly obvious limits, namely, that which is so great, it will not give a dispersion at all and that which is so low, it is impractical to remove the excess water by distillation. The quantity of water remaining in the color concentrate when it is incorporated in the spinning solution is very critical, however, and the limit must be observed if the process is to operate. If more than about three percent water, based on the total weight of organic solvent, is present, coagulation or gelation of polymer will result upon contact of the two liquids, resulting in considerable difficulty in spinning.

Any pigment can be used in the process of this invention provided it is water-dispersible to give particles having a diameter not substantially greater than about 1 micron. Examples of suitable pigments for incorporation in fibers of acrylonitrile polymers in accordance with this invention are: Dianisidine Blue (C.I. 499), Indanthrone Blue (C.I. 1113), Monastral Blue (Pr. 481), Monastral Green (Pr. 483), Watchung Red (Pr. 563), Indo Blue (C.I. 1113), Phthalocyanine Green (Pr. 483), and Permanent Brown, a product of The Sherwin-Williams Company. The spinning solutions prepared in accordance with this invention and containing a polymer of at least 85 percent acrylonitrile, a solvent for said polymer, and a pigment dispersed therein, are used to prepare fibers by conventional wet and dry spinning methods. To obtain fibers of optimum physical properties polymers of molecular weight in excess of 25,000 are used, and when using such polymers it is possible to dissolve from five to 35 percent in the usual solvents mentioned above. The concentration of the polymer in the final solution is preferably between about seven and 25 percent, but will ultimately be determined by considering the desired physical properties of the fiber, the solvent used and the speed of spinning. The fibers are spun by extruding the solution of the acrylonitrile polymer through an orifice, or a spinneret having a plurality of orifices, into a medium which removes the solvent. The medium into which the solution is extruded and which removes the solvent may be either liquid or gaseous. The method involving the use of liquids is known as "wet spinning"; and any liquid which is a non-solvent for the acrylonitrile polymer, but which either dissolves the solvent used, or converts it into soluble compounds, may be used. The method involving the use of a gaseous medium is known as "dry spinning," and according to that method, air, steam, nitrogen, or other gas or mixture of gases which are inert at the spin temperature, are used to remove the solvent. This method operates at higher temperatures and the solvent is evaporated from the surface of the fiber.

The following examples in which parts, proportions, and percentages are by weight illustrate further the application of my invention.

*Example I*

A spinning dope containing approximately two percent dispersed blue pigment was prepared in the following manner. There was dispersed in 850 gms. of a solvent consisting of dimethylacetamide containing 2.0 percent acetic acid and 0.10 percent water a total amount of 15 gms. of a blue pigment dispersed as an aqueous paste (Monastral Blue, Pr. 481). The pigment paste contained 19.3 percent solids by weight. Thus, there was formed a color concentrate containing approximately 1.52 percent water. There was then added to the resulting pigment dispersion in solvent 150 gms. of a ground polymer consisting of 94 percent acrylonitrile and six percent vinyl acetate and the polymer dissolved in the solvent by stirring for one hour at 90° C. The resulting spinning dope contained 1.93 percent of dispersed pigment based on the weight of polymer and constituted a 15 percent solution of the polymer.

The spinning dope prepared by the above procedure was spun through a 100-hole spinneret at a rate of 5.2 cc. per minute into a coagulating bath of dimethylacetamide and water in the usual manner of wet-spinning. The resulting fibers were subjected to an overall stretch ratio of 2.73 and dried. The dried fibers of 310 denier were of a deep blue color. Photomicrographs of the fiber cross section showed the pigment to be homogeneously distributed.

*Example II*

In order to prepare a spinning dope containing approximately five percent pigment the excess water must be removed from the color concentrate employed. A color concentrate was prepared by dispersing 37.5 gms. of the same blue pigment as in Example I dispersed as an aqueous paste in 100 gms. of a solvent consisting of dimethylacetamide containing 2.0 percent acetic acid and 0.10 percent water in a 200 ml. round-bottomed flask. There was then distilled at atmospheric pressure from the dispersion of pigment in solvent a total of 79.7 gms. of an azeotropic mixture in several cuts containing 28.6 gms. of water. A total of 53.2 mls. of dimethylacetamide was returned to the flask. The water content of the color concentrate was thus adjusted to 1.63 percent.

A spinning dope was then prepared by dissolving 150 gms. of a ground polymer consisting of 94 percent acrylonitrile and six percent vinyl acetate in 750 gms. of the same solvent described above by stirring for one hour at 96° C. The color concentrate prepared above was then added to the polymer solution and agitated for five minutes. The resulting spinning dope contained 4.84 percent of dispersed pigment based on the weight of the polymer and constituted a 15 percent solution of the polymer.

The spinning dope prepared by the above procedure was spun through a 100-hole spinneret at a rate of 5.2 cc. per minute into a coagulating bath of dimethylacetamide and water in the usual manner of wet-spinning. The resulting fibers were subjected to an overall stretch ratio of 2.73 and dried. The dried fibers of 310 denier were of a very deep blue color. Photomicrographs of the fibers' cross section showed the pigment to be homogeneously distributed.

*Example III*

A spinning dope containing dispersed pigment was prepared in the following manner: There was dispersed in 1,240 gms. of a solvent consisting of dimethylacetamide containing 2.0 percent acetic acid and 0.15 percent water, 3.9 gms. of an orange pigment dispersed as a water paste (Orange Pigment YE–84–P of E. I. du Pont de Nemours and Company). There was then distilled at atmospheric pressure from the dispersion of pigment in solvent 32.0 mls. of liquid consisting of ten percent water by volume, or a total of 3.2 mls. of water. The water content of the dispersion of pigment in solvent was thus adjusted to approximately 0.15 percent. There was then added to the pigment-solvent dispersion 182 gms. of a ground copolymer consisting of 94 percent acrylonitrile and six percent vinyl acetate and the polymer dissolved in the solvent by stirring for one hour at 80° C. The resulting spinning dope constituted a 13.5 percent solution of the polymer and contained 0.385 percent of dispersed pigment based on the polymer weight. The spinning dope prepared by the above procedure was spun after ageing 16 hours at room temperature through a 40-hole spinneret at the rate of 3.0 cc. per minute into a coagulating bath of dimethylacetamide and water in the usual manner of wet-spinning. The resulting fibers were subjected to an overall stretch ratio of 2.56 and dried. The dried fibers were colored a deep orange. Upon microscopic examination the pigment was found to be homogeneous throughout the cross section of the fibers.

It is to be understood that changes and variations may be made without departing from the spirit and scope of the invention as defined in the appended claims.

I claim:

1. A process for preparing a solution of a polymer of at least 85 percent by weight acrylonitrile and up to 15 percent of another monomer copolymerizable therewith in an organic solvent therefor and having water-dispersible pigment particles none greater than about 1 micron in diameter dispersed throughout said solution, which comprises mixing an aqueous dispersion of said pigment particles none greater than about 1 micron in diameter with a water-miscible organic solvent for acrylonitrile polymers which is chemically inert with respect to the said pigment and polymers and which has a boiling point higher than about 120° C., distilling water from the resulting dispersion until the water content thereof is reduced to not more than three percent water, based on the weight of the said organic solvent, and incorporating the resulting dispersion of pigment in said organic solvent in a solution of a polymer of at least 85 percent by weight acrylonitrile and up to 15 percent by weight of another mono-olefinic copolymerizable monomer.

2. The process of claim 1 wherein the said polymer of at least 85 percent by weight acrylonitrile and up to 15 percent by weight of another mono-olefinic copolymerizable monomer is dissolved in the chemically inert water-miscible organic solvent in which the said pigment is dispersed.

3. The process of claim 1 wherein the said aqueous dispersion of pigment contains from about 50 percent to about 90 percent water.

4. The process of claim 1 wherein the solvent used is a member of the group consisting of N,N-dimethylacetamide, N,N-dimethylformamide, tris(dimethylamido) phosphate, ethylene carbonate, bis(dimethylamido)methanephosphonate, dimethyl methanephosphonate, N-methylpyrrolidone, 1,5-dimethylpyrrolidone, butyrolactone, diethyl phosphite, and N,N-dimethylmethoxyacetamide.

5. The process of claim 4 wherein the organic solvent used for the dispersion of the pigment is the same as the solvent used for solution of the polymer of at least 85 percent acrylonitrile.

6. The process of claim 4 wherein the dispersion of pigment in organic solvent is incorporated in the polymer solution by mixing the said dispersion of pigment in organic solvent with a solution of a polymer of at least 85 percent by weight acrylonitrile and up to 15 percent by weight of another mono-olefinic copolymerizable monomer in the same solvent.

7. A process for preparing fibers having pigment particles none greater than about 1 micron in diameter dispersed throughout, which comprises mixing an aqueous dispersion of said pigment particles none greater than about 1 micron in diameter with a water-miscible solvent for acrylonitrile polymers which is chemically inert with respect to said pigment and acrylonitrile polymers and which has a boiling point higher than about 120° C., distilling water from the resulting dispersion until the water content thereof is reduced to not more than three percent water, based on the weight of the said organic solvent, incorporating the resulting dispersion of pigment in the said solvent in a solution of a polymer of at least 85 percent by weight acrylonitrile and up to 15 perecent by weight of another mono-olefinic copolymerizable monomer in the same solvent, and extruding the resulting homogenous mixture through a spinneret into a coagulating medium to produce fibers.

8. The process of claim 7 wherein the solvent used is a member of the group consisting of N,N-dimethylacetamide, N,N-dimethylformamide, tris(dimethylamido) phosphate, ethylene carbonate, bis(dimethylamido) methanephosphonate, dimethyl methanephosphonate, N-methylpyrrolidone, 1,5-dimethylpyrrolidone, butyrolactone, diethyl phosphite, and N,N-dimethylmethoxyacetamide.

9. The process of claim 8 wherein the dispersion of pigment in organic solvent is incorporated in the polymer solution by mixing the said dispersion of pigment in organic solvent with a solution of a polymer of at least 85 percent by weight acrylonitrile and up to 15 percent by weight of another mono-olefinic copolymerizable monomer in the same solvent.

10. A process for preparing a solution of a polymer of at least 85 percent by weight acrylonitrile in N,N-dimethylacetamide and having water-dispersible pigment particles none greater than about 1 micron in diameter dispersed throughout said solution, which comprises mixing an aqueous dispersion of said pigment particles none greater than about 1 micron in diameter with N,N-dimethylacetamide, distilling water from the resulting dispersion until the water content thereof is reduced to not more than three percent water based on the weight of N,N-dimethylacetamide, and incorporating the resulting dispersion of pigment in N,N-dimethylacetamide in a solution of a polymer of at least 85 percent by weight acrylonitrile and up to 15 percent by weight of another mono-olefinic copolymerizable monomer in N,N-dimethylacetamide.

11. A process for the incorporation of water-dispersible pigment particles none greater than about 1 micron in diameter in an N,N-dimethylacetamide solution of a polymer of at least 85 percent by weight acrylonitrile and up to 15 percent by weight of another mono-olefinic copolymerizable monomer, which comprises mixing said polymer solution with a dispersion of said pigment particles in N,N-dimethylacetamide from which dispersion water has been distilled until the water content thereof is reduced to not more than three percent water, based on the weight of the N,N-dimethylacetamide.

12. The process of claim 10 wherein the polymer is polyacrylonitrile.

13. The process of claim 10 wherein the polymer is a copolymer of at least 85 percent by weight acrylonitrile and up to 15 percent by weight vinyl acetate.

14. The process of claim 10 wherein the polymer is a copolymer of at least 85 percent by weight acrylonitrile and up to 15 percent by weight vinyl chloride.

References Cited in the file of this patent

UNITED STATES PATENTS

| | | |
|---|---|---|
| 1,955,825 | Palmer | Apr. 24, 1934 |
| 2,271,323 | Yee | Jan. 27, 1942 |
| 2,287,416 | Dann | June 23, 1942 |
| 2,692,185 | Hooper et al. | Oct. 19, 1954 |

OTHER REFERENCES

Hill: "Fibers from Synthetic Polymers," pages 530–534.